8505X
2 Sheets. Sheet 1.
Fowler & Germond,
Carding Machine.
Patented Nov. 24, 1834.
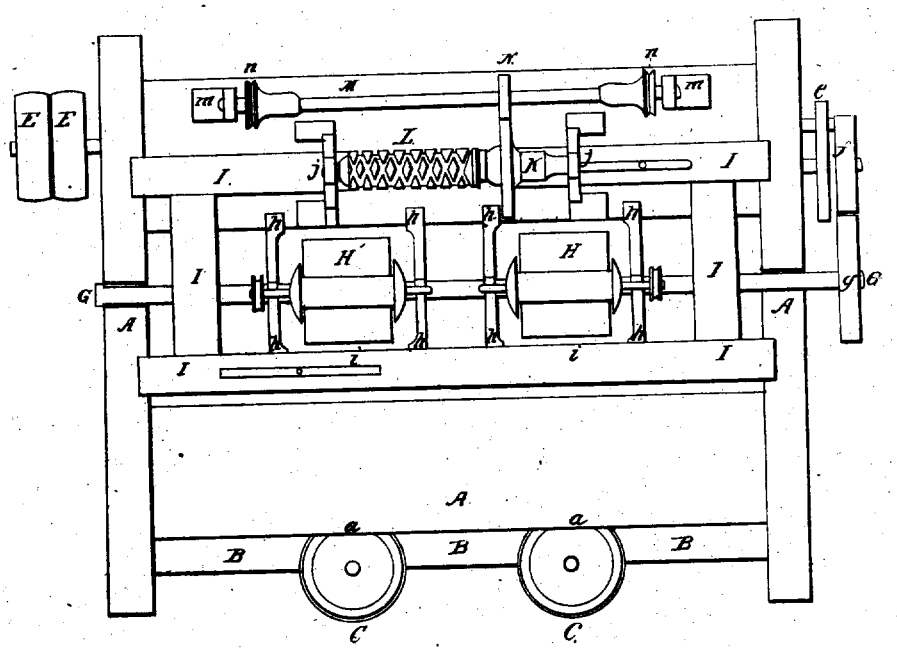
L
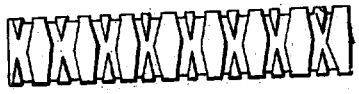

8505X
2 Sheets. Sheet 2.
Fowler & Germond,
Carding Machine.
Patented Nov. 24, 1834.
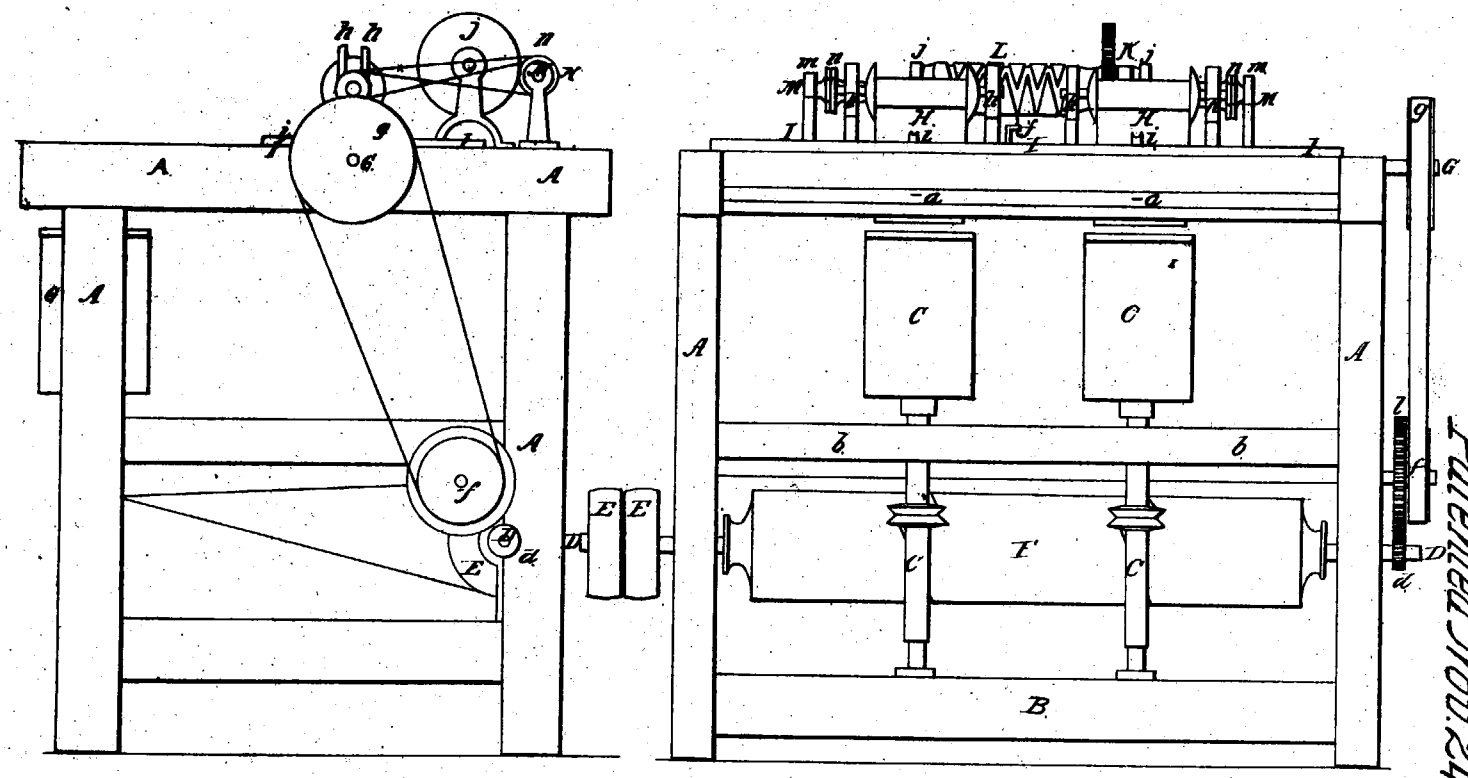

William Fowler & Richard M. Germond, of Union Vale, N.Y.
Letters Patent

The schedule referred to in these Letters patent, and making part of the same containing a description in the words of the said William Fowler & Richard M. Germond, themselves, of their improvement in a machine for twisting roving from the several speeders on which roving is condensed.

To all persons to whom these presents shall come. Be it known, that we William Fowler & Richard M. Germond, of Union Vale, in Dutchess County, in the State of New York; have invented a new and useful machine for twisting roving made on the several speeders on which roving is condenced by counter twist; by rubbing, or made in any way without twist. & that the following is a full and exact description of the construction and operation of the said machine, as invented or improved by us. Note - in the following description of this machine that side having on it the spindles, will be called the front side, and the opposite the back side. That end having the driving pullies will be called the pulley end, and the opposite the geer end. This machine consists of a frame two and an half feet wide, three feet high and its length must correspond to the number of spindles employed in it, and will require about six inches for each spindle, which number may be six or more as desired. This frame work consists of 4 posts, with girths, all round near the bottom, and near the middle with plates on the top of the posts across each end. A plank one foot wide, connects these plates on the back side. a beam also connects these plates, leaving a space between the plank and beam, of seven & an half inches. Forward of this beam is the rail for the guide wires having its upper surface two inches below the top of the beam. To the front edge of this rail is the faller rib, connected with it by butts or hinges, so that the guide wires in the front edge of the rib will be brought directly over the centre of the spindle. This frame work is marked A, and the rib containing the guide wires is marked a. The front lower girth forms the step rail and is marked B. The front middle girth is four and an half inches wide, and is framed into the posts and middle end girths, and the front edge comes directly over the middle of Drawing the step-rail or centre of the steps and forms the spindle rail or upper bearings of the spindles, which are let into it, one half their diameter. On the front edge of this rail is secured the spindle caps, which, with the spindle rail completely enclose the spindles. and is brought flush with the front side of the posts, and is marked B. all these parts and pieces being thus arranged and adjusted the spindles are entered in their steps & bearings. These spindles are marked C. and are in form below the bearings similar to the common English live spindle with its whirl to give it motion. but above the bearing it is wholly new, and our invention, and consists of a simple pin suited to the size of the hole in the bobbin through which it is to pass, and is formed by a continuation of the stem of the spindle above the bearing, and enclosed within a tin can or cup of sufficient diameter to receive within the bobbin, when placed on the pin and leaving a space of half an inch between the periphery of the bobbin and the inside of the can. This can or cup is open at the top, and has a bottom of tin, with a flange of the same, extending downwards to the bearing and enclosing the pin of the spindle to which it is firmly soldered. The can may be raised a small distance above the bobbin and pin. Two bearings with caps are then fitted in the front side of each back post marked c. about thirteen inches upwards from their feet. The main shaft is then fitted in these bearings marked D. having on its pulley end outside of the frame a fast and loose pully of seven inches diameter and three inches on the face, and are the driving pullies of the machine marked E. and on the geer end outside of the frame, a pinion cog-wheel of twenty-six teeth marked d. and between the posts this shaft has upon the main cylinder extending the whole length of the line of the spindles, and may be seven inches in diameter and is marked F. From the middle girth on the geer end a small distance forward from the back post, a stand is bolted, projecting downwards, and having in it a stud projecting outwards, and receiving upon it a cog-wheel of eighty teeth marked e, to match and geer into the pinion-wheel on the main shaft. This stud wheel has on its hub a pulley of six inches diameter and one & a half inches on the face marked f. A shaft is next placed in bearings in the top plates on each end of the frame in such a manner as to bring the shaft exactly in the middle of the Space between the top plank and beam before
mentioned, and a little lower than the top of the plates. On this Shaft
which is marked (f.) on the gear end is a pulley of seven and half
inches diameter marked g. and in a line with the pully f. on the hub
of the cog-wheel c. and on this Shaft. and in a line with the spindles are an
equal number of winding blocks marke. H.H. of six & three quarter inches diameter
and of a length to play freely between the heads of the bobbins, to be filled with
the roving when twisted. at a small distance from each of these blocks a crotched
stand is raised having one foot of each bolted to the top plank and the other
foot to the beam, and their legs are raised in a circular manner and united
at a highth of the upper surface of the winding blocks and directly over the
shaft at this point of union they are projected upwards & slitted to receive
the pins on which the bobbins are fixed, and to serve as a guide for them to
turn and rise in as they fill. These stands are marked h.. the pins upon which
the bobbins are placed while winding, pass through the centre of the bobbin, and
have on one end of each pin a scored pulley of one and an half inches diam-
-eter. a traverse frame is then framed about fourteen inches wide and extending the
whole length of the line of blocks with room to traverse marked I. The back
side of the front piece of this frame is even with the back side of the beam,
and rests and slides upon it. The back piece of the frame rests and slides
upon the plank, and these pieces are held together by girths connecting the
ends; a slit is made in each side piece of this frame at opposite ends of
sufficient length to permit it to move endwise, the length of the bobbins, and
of sufficient width to pass freely on a steady pin in the plank and beam
which it receives, and which serves to guide its lateral motion. On the front
piece of this carriage are a number of guides or grooves equal to the number
of bobbins to be filled _ these guides are marked i. Two crotched stands are
then raised from the plank - the first may be about fourteen inches inwards
from the gear end, and the other thirteen inches from the first. The front feet
of these stands may be even with the front edge of the plank. the other feet
may be one and half inches back of the back piece of the Traverse carriage.
These feet are bolted to the plank, and rising in a circular form are united
directly over the centre of the back piece of the carriage, leaving under them a sufficient space for this piece of the carriage to move freely. They are then projected upwards and form the bearings for the double screw shaft next described, these stands are marked j.- a shaft is then entered in these stands four and an half inches high from the plank marked K. having on its geer end a cog-wheel of sixty-four teeth, and from this cog-wheel towards the pully end a double traverse screw of sufficient length to give a traverse motion the whole length of the bobbins between the heads and is marked L. a small stand is then raised from the back piece of the traverse carriage and turned horizontally about two inches, and through this stand a traverse guide is passed having its bearing in the stand, and its step in the top of the back piece of the carriage. The upper part of this guide is circular and is fitted into the grooves of the screw and is marked l - Two upright stands are then raised near each end of the plank on the back part marked m. to the same heighth with those holding the screw shaft into these stands a shaft marked M. is entered having on a scored pully of 2 1/4 inches diameter marked n.n.n. in a line with each pully on the pins of the bobbins, and a cog-wheel marked N. of twenty-six teeth in a line with, and to match and geer into the cog wheel on the screw shaft. When all the before mentioned parts & pieces of this machine are thus adjusted, and the geering before mentioned all entered in geer (all which geering is of the kind commonly called spur geering and may have about 10 teeth to each inch of the diameter of each wheel). A strap or belt is passed round the pully on the hub of the cog wheel c. and arround the pully on the shaft of the winding blocks, and a band is passed and crossed arround each pully on the bobbin pins and each pully on the shaft M. corresponding to them. And bands are also passed round the main cyllinder and each of the spindle whirls. Then place a bobbin of the roving to be twisted upon each spindle within the can, and an empty bobbin upon each of the winding blocks; unwind a small piece of roving from each bobbin on the spindles, give it a slight twist with the hand, pass it through the guide wire over the spindle & through the guides on the traverse carriage, and attach it to the bobbins on the winding blocks. Then pass a belt from the driving power of the mill arround the fast main pully - and all will be in motion. The roving from the bobbins on the spindles will be thrown from the bobbins on the spindles by the action of the centrifugal power gently against the inner side of the cans, from whence it will be drawn by a slow motion through the guide wires and guides to the receiving bobbins on the blocks, receiving as it passes a proportion of the twist equal to the relative motion of the spindles with that of the winding block which may be adjusted to any quantity of twist desired by the operator. The receiving bobbins will be moved by the friction of the blocks. The shaft M. will be moved by the bands from the pullies on the bobbin pins acting on the pullies n.n.n. The cog-wheel N. geering into the cog wheel on the screw shaft will cause the shaft to turn the worm will force the guide connected with the traverse carriage will, be moved towards that end of the screw to which its diagonal grooves tend until it arrives at the extreme point, when by the common reverse movement it is changed into the grooves of the reversed screw, when it will be carried back again to the extreme point at the other end when it will be again changed, and this guide and with it the carriage to which it is attached, will be moved in this maner while the machine operates and the guide grooves on the front piece of the carriage, will be caused to pass and repass in front of the receiving bobbins on the blocks, and will distribute the threads of roving passing between them evenly between the heads of the bobbins, untill they are filled when they must be doffed and replaced with an empty set as the bobbins on the spindles become emptied of their roving they can be taken out and full ones put on the spindles, without stopping them. Also, the machine may be doffed without stopping if the opperator see fit. Note- The motion of the spindles must be contrary to the motion the bobbin had while filling upon the speeder on which it was originally made, or it must have the same motion which would be given to it by drawing off the roving from it when on the spindle and the spindle free to let it turn- The advantages of this machine will be obvious to all who have used the roving from the various condensing speeders, condensing by counter twist or by rubbing, and the many attempts which have been made to impart the necessary strength to those rovings, show the importance of the result now obtained, and by using this simple improvement, the roving in all respects better than that from the geared speeder or fly frame, is obtained, and the great expense of those frames saved to the manufacturer. As many parts of this machine have been long known, as the traverse and winding motions, and others. We therefore to the invention of those parts seperately lay no claim whatever, but what we do specifically claim as our invention, is all the parts and arrangements of the spindle above the bearing, consisting of the can or cup as arranged and fitted for turning the bobbin and the principal and method of throwing off the roving from the bobbin by the action of the centrifugal power of its motion and sustaining it against the inside of the can untill drawn away by the receiving bobbin and imparting to it during this process any quantity of twist, as before described. And we also claim the other parts of this machine as combined with the new parts invented by us and the general arrangements of these parts as before described by which we have produced a new and useful process or series of machinery never before known or used, and we claim these new and combined parts as united in these machines not only in the proportions above described, but in any or in all proportions in which the principal discovered and invented by us may be useful.

In testimony that the foregoing is a true specification or description of our said improvement and invention we have hereunto set our hands this 29th day of July 1834.

Witnesses
Thos. Vosburgh
Isaac Vail

William Fowler
Richard M. Gemond

[illegible]

[2576 [illegible]